(12) United States Patent
Kwon et al.

(10) Patent No.: US 10,908,749 B2
(45) Date of Patent: Feb. 2, 2021

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Do Hyoung Kwon, Gyeonggi-do (KR); Sung Jin Noh, Gyeonggi-do (KR); Han Tae Ryu, Chungcheongbuk-do (KR); Sang Jin Park, Gyeonggi-do (KR); Jun Gu Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 16/568,921

(22) Filed: Sep. 12, 2019

(65) Prior Publication Data
US 2020/0089352 A1   Mar. 19, 2020

(30) Foreign Application Priority Data

Sep. 17, 2018  (KR) .......................... 10-2018-0110713

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04103* (2013.01); *G06F 2203/04112* (2013.01)

(58) Field of Classification Search
CPC ....... G06F 3/044; G06F 3/0412; G06F 3/0416
USPC ........... 345/163, 173, 174; 349/12; 200/600; 216/13
See application file for complete search history.

(56) References Cited

U.S. PATENT DOCUMENTS

| | | | | |
|---|---|---|---|---|
| 2012/0169628 A1* | 7/2012 | Kuo | ........................ | G06F 3/044 345/173 |
| 2013/0207911 A1* | 8/2013 | Barton | ................. | H03K 17/962 345/173 |
| 2015/0041302 A1* | 2/2015 | Okumura | ................ | G06F 3/044 200/600 |
| 2015/0070278 A1* | 3/2015 | Rehn | ................... | G06F 3/03547 345/163 |
| 2015/0077646 A1* | 3/2015 | Chen | ..................... | G06F 3/0418 349/12 |

(Continued)

FOREIGN PATENT DOCUMENTS

KR   10-1315227 B1   10/2013

*Primary Examiner* — Prabodh M Dharia
(74) *Attorney, Agent, or Firm* — The PL Law Group, PLLC

(57) ABSTRACT

A touch sensor includes a base layer, sensing electrodes arranged on the base layer, a bridge electrode and a connecting portion. The sensing electrode layer includes first sensing electrodes arranged along a first direction parallel to a top surface of the base layer, and second sensing electrodes arranged along a second direction parallel to the top surface of the base layer. The bridge electrode is disposed on the sensing electrodes to electrically connect the first sensing electrodes neighboring in the first direction to each other. The bridge electrode includes an extension portion and expanded portions formed both ends of the extension portion. The expanded portion has a width greater than that of the extension portion. The connecting portion electrically connects the second sensing electrodes neighboring in the second direction and includes at least one etched region.

13 Claims, 7 Drawing Sheets

(56) References Cited

U.S. PATENT DOCUMENTS

| 2015/0181715 | A1* | 6/2015 | Jaw | H05K 3/00 |
| | | | | 216/13 |
| 2016/0246405 | A1* | 8/2016 | Hu | G06F 3/0446 |
| 2017/0147124 | A1* | 5/2017 | Li | G06F 3/0445 |
| 2019/0361555 | A1* | 11/2019 | Lee | G02F 1/133528 |

* cited by examiner

TOUCH SENSOR AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2018-0110713 filed on Sep. 17, 2018 in the Korean Intellectual Property Office (KIPO), the entire disclosure of which is incorporated by reference herein.

BACKGROUND

1. Field

The present invention relates to a touch sensor and an image display device including the same. More particularly, the present invention relates to a touch sensor including a plurality of sensing electrodes and conductive patterns and an image display device including the same.

2. Description of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

For example, the touch sensor may include sensing electrodes configured to generate capacitance and connecting patterns configured to connect the sensing electrodes. When the connecting patterns overlap each other, a parasitic capacitance may be generated to degrade sensitivity of the sensing electrodes. Further, a visibility of electrodes may be increased by the connecting patterns, and an image quality of an image display device may be also deteriorated.

For example, Korean Registered Patent No. 10-1315227 describes structures for reducing capacitance generated between a touch sensor and a data line, however, fails to conceive the parasitic capacitance within electrodes of the touch sensor.

SUMMARY

According to an aspect of the present invention, there is provided a touch sensor having improved optical property and electrical reliability.

According to an aspect of the present invention, there is provided a window stack structure and an image display device including the touch sensor that has improved optical property and electrical reliability The above aspects of the present inventive concepts will be achieved by the following features or constructions:

(1) A touch sensor, comprising a base layer; sensing electrodes arranged on the base layer, the sensing electrodes including: first sensing electrodes arranged along a first direction parallel to a top surface of the base layer; and second sensing electrodes arranged along a second direction parallel to the top surface of the base layer, the first direction and the second direction crossing each other; a bridge electrode disposed on the sensing electrodes to electrically connect the first sensing electrodes neighboring in the first direction, the bridge electrode including an extension portion and expanded portions formed both ends of the extension portion, the expanded portion having a width greater than that of the extension portion; and a connecting portion electrically connecting the second sensing electrodes neighboring in the second direction and including at least one etched region.

(2) The touch sensor according to the above (1), wherein the bridge electrode has a dumbbell shape.

(3) The touch sensor according to the above (1), wherein the expanded portion is superimposed over the first sensing electrode, and at least a portion of the extension portion overlaps the etched region of the connecting portion.

(4) The touch sensor according to the above (3), wherein the connecting portion includes a plurality of the etched regions formed along an extending direction of the extension portion.

(5) The touch sensor according to the above (3), wherein a pair of the first sensing electrodes neighboring in the first direction are connected to each other by a plurality of the bridge electrodes.

(6) The touch sensor according to the above (1), wherein the connecting portion is integrally connected to the second sensing electrodes neighboring each other.

(7) The touch sensor according to the above (1), further comprising an insulation layer covering the connecting portion, wherein the bridge electrode is formed on the insulation layer to overlap the connecting portion.

(8) The touch sensor according to the above (7), wherein the insulation layer fills the etched region formed in the connecting portion.

(9) The touch sensor according to the above (7), wherein the bridge electrode includes a contact extending from the expanded portion to be in contact with the first sensing electrode, wherein the contact has a smaller width than that of the expanded portion.

(10) The touch sensor according to the above (9), wherein the contact is formed through the insulation layer.

(11) The touch sensor according to the above (1), wherein the etched region has a hole shape formed in the connecting portion.

(12) The touch sensor according to the above (1), wherein the etched region has a recess shape formed at a lateral portion of the connecting portion.

(13) The touch sensor according to the above (12), wherein the etched region includes a pair of the recesses formed at both lateral portions of the connecting portion.

(14) The touch sensor according to the above (1), wherein the sensing electrodes, the bridge electrode and the connecting portion include a transparent conductive oxide.

(15) An image display device, comprising a display panel; and the touch sensor according to any one of the above (1) to (14) on the display panel.

(16) The image display device according to the above (15), further comprising an adhesive layer combining the display panel and the touch sensor with each other.

In a touch sensor according to exemplary embodiments as described above, a bridge electrode may include an extension portion having a width smaller than that of both end portions of the bridge electrode, and the extension portion may overlap a connecting portion that may be integral with sensing electrodes. The width of the extension portion overlapping the connecting portion may be reduced so that a parasitic capacitance may be avoided or reduced and a sensitivity degradation of the touch sensor may be prevented. The connecting portion may include an etched region so that the parasitic capacitance may be suppressed more efficiently.

Additionally, areas of the bridge electrode and the connecting portion may be decreased so that a visibility of electrodes and a color sense difference due to a reflectivity change may be prevented.

DETAILED DESCRIPTION

According to exemplary embodiments of the present invention, there is provides a touch sensor including a bridge electrode and a connecting portion configured to connect sensing electrodes while remarkably reducing a parasitic capacitance and a reflectivity difference. A window stack structure and an image display device including the touch sensor are also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying figures, two directions parallel to a top surface of a touch sensor or a base layer 100 and crossing each other may be designated as a first direction and a second direction. For example, the first direction and the second direction are perpendicular to each other.

Figure 1:
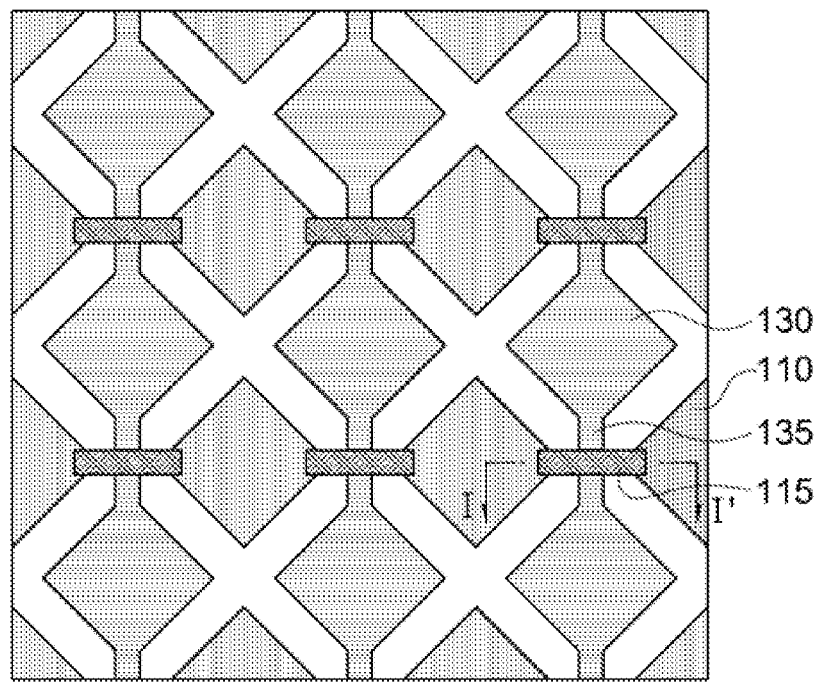
FIGS. 1 and 2 are a top planar view and a partially enlarged cross-sectional view, respectively, illustrating schematic electrode arrangements of a touch sensor in accordance with a comparative example.
Figure 1:
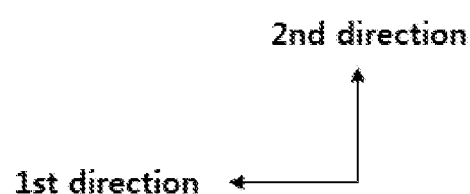
Figure 2:
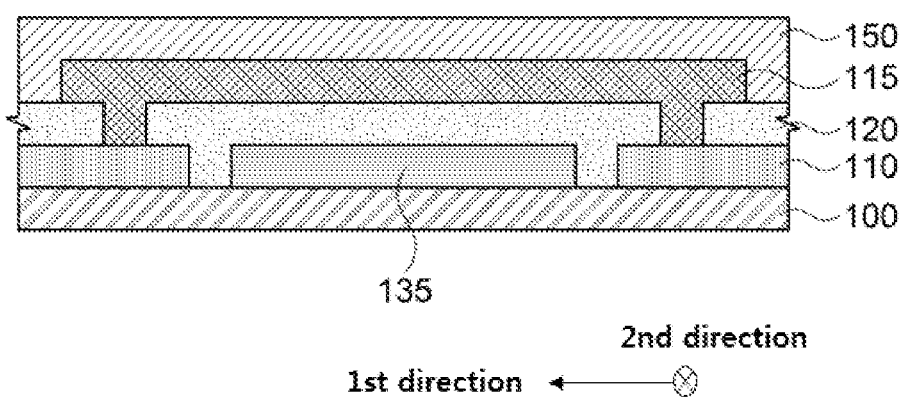

FIGS. 1 and 2 are a top planar view and a partially enlarged cross-sectional view, respectively, illustrating a touch sensor in accordance with a comparative example. Specifically, FIG. 2 is a cross-sectional view taken along a line I-I' of FIG. 1

Referring to FIGS. 1 and 2, the touch sensor may include a base layer 100, sensing electrodes 110 and 130, a bridge electrode 115 and a connecting portion 135.

The base layer 100 may serve as a supporting layer or a film-type substrate for formation of the sensing electrodes 110 and 130. For example, the base layer 100 may include a film material commonly used in a touch sensor. For example, the base layer 100 may include glass, polymer and/or an inorganic insulation material. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The inorganic insulation material may include, e.g., silicon oxide, silicon nitride, silicon oxynitride, a metal oxide, etc.

A layer or a film member in an image display device to which the touch sensor is applied may also serve as the base layer 100. For example, an encapsulation layer or a passivation layer included in the display panel may serve as the base layer 100.

The sensing electrodes 110 and 130 may include first sensing electrodes 110 and second sensing electrodes 130. For example, the sensing electrodes 110 and 130 may be arranged to be operated by a mutual capacitance type.

The first sensing electrodes 110 may be arranged along the first direction. Each first sensing electrode 110 may have an island pattern shape, and the first sensing electrodes 110 neighboring in the first direction may be electrically connected to each other by the bridge electrode 115.

Accordingly, a first sensing electrode row extending in the first direction may be defined, and a plurality of the first sensing electrode rows may be arranged along the second direction The second sensing electrodes 130 may be arranged along the second direction. The second sensing electrodes 130 neighboring in the second direction may be connected to each other by the connecting portion 135. The second sensing electrodes 130 and the connecting portion 135 may be integrally connected to each other to be a substantially unitary member. In this case, the second sensing electrodes 130 and the connecting portion 135 may be formed by patterning the same conductive layer to be placed at the same layer or at the same level.

Accordingly, a second sensing electrode column extending in the second direction may be defined, and a plurality of the second sensing electrode columns may be arranged along the first direction.

As illustrated in FIG. 2, the insulation layer 120 may be formed on the base layer 100 to at least partially cover the first sensing electrodes 110 and the connecting portion 135. The bridge electrode 115 may be disposed on the insulation layer 120 so that the first sensing electrodes 110 neighboring each other may be electrically connected to each other, e.g., via contact holes formed in the insulation layer 120.

A passivation layer 150 may be formed on the insulation layer 120 and the bridge electrode 115 to protect the touch sensor.

According to the touch sensor of the comparative example as described with reference to FIGS. 1 and 2, the bridge electrode 115 may overlap the connecting portion 135 with respect to the insulation layer 120. Thus, a parasitic capacitance may be generated between the bridge electrode 115 and the connecting portion 135, and a mutual capacitance created between the sensing electrodes 110 and 130 may be disturbed by the parasitic capacitance. As a result, desired touch sensitivity and resolution from the sensing electrodes 110 and 130 may not be implemented.

Additionally, a reflectivity may be increased at an intersection area at which a stack structure including the connecting portion 135, the insulation layer 120 and the bridge electrode 115 is formed due to a change of refractive indexes at interfaces between the layers to result in a visibility increase of the electrodes. Further, a color difference may be caused due to differences of the refractive indexes between the layers to degrade an image quality of an image display device.

Figure 3:
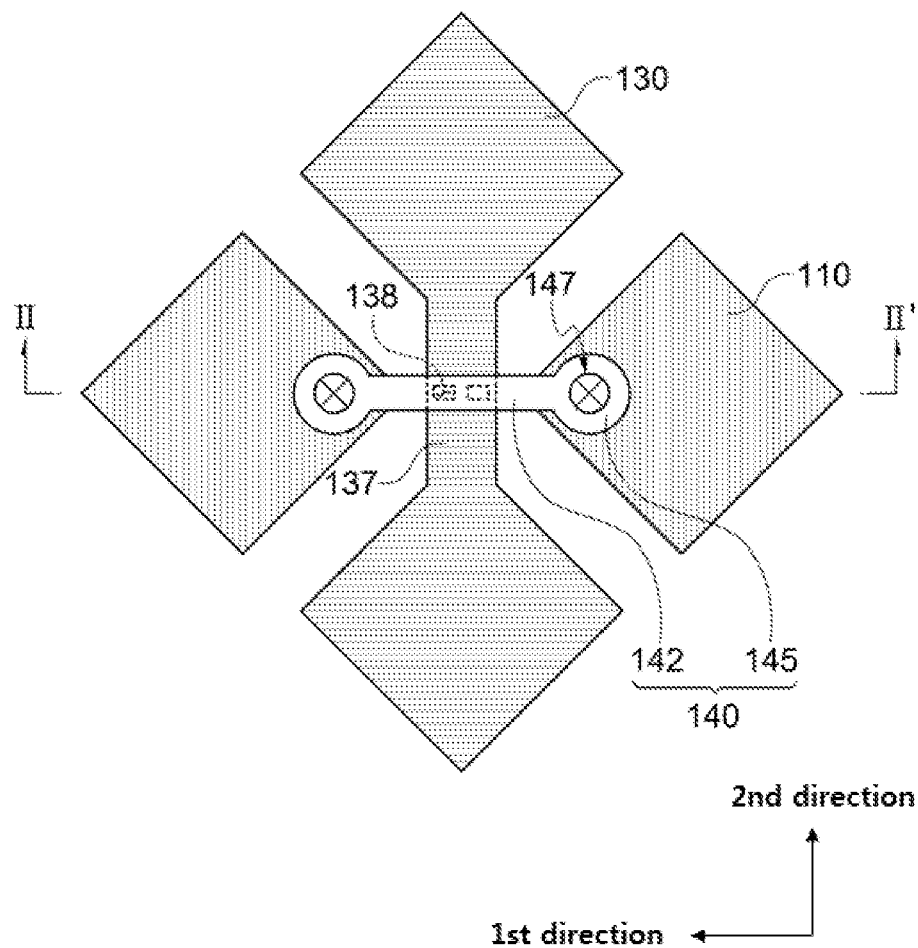
FIGS. 3 and 4 are a partially enlarged top planar view and a partially enlarged cross-sectional view, respectively, illustrating schematic electrode arrangements of a touch sensor in accordance with exemplary embodiments.
Figure 4:
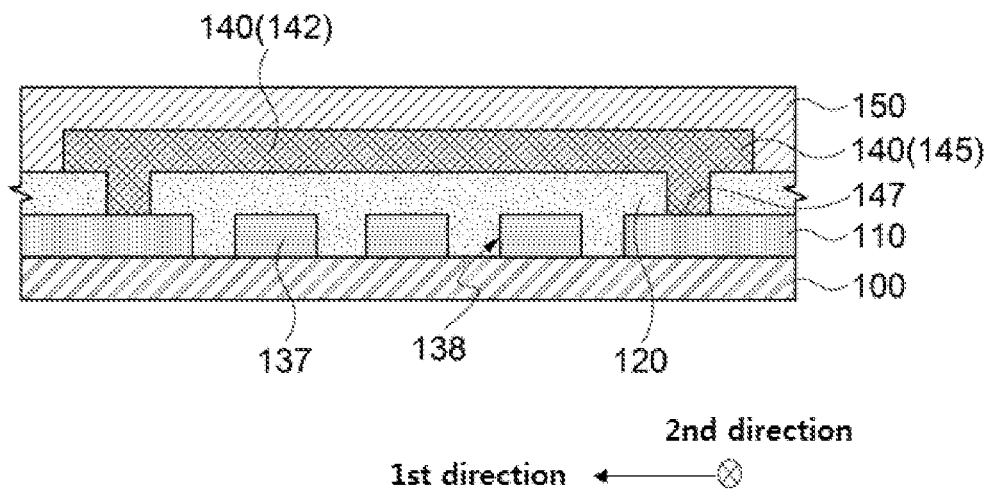

FIGS. 3 and 4 are a partially enlarged top planar view and a partially enlarged cross-sectional view, respectively, illustrating schematic electrode arrangements of a touch sensor in accordance with exemplary embodiments. Specifically, FIG. 4 is a cross-sectional view taken along a line II-IF of FIG. 3.

Detailed descriptions on elements substantially the same as or similar to those illustrated with reference to FIGS. 1 and 2 are omitted herein.

Referring to FIGS. 3 and 4, as described with reference to FIGS. 1 and 2, a touch sensor may include first sensing electrodes 110 and second sensing electrodes 130.

A bridge electrode 140 may extend in the first direction to electrically connect the first sensing electrodes 110 neighboring each other. The bridge electrode 140 may include an extension portion 142 and an expanded portion 145 formed at each of both ends of the extension portion 142.

In exemplary embodiments, the expanded portion 145 may have a width (e.g., a width in the second direction in a planar view) greater than that of the extension portion 142. Accordingly, the bridge electrode 140 may have a substantially dumbbell shape.

A connecting portion 137 may extend in the second direction to electrically connect the second sensing electrodes 130 neighboring each other. As described above, the connecting portion 137 may be integral with the second sensing electrodes 130 to be a substantially unitary member.

In exemplary embodiments, the extension portion 142 of the bridge electrode 140 may overlap the connecting portion 137 with respect to the insulation layer 120. The expanded portion 145 of the bridge electrode 140 may be also at least partially superimposed over the first sensing electrode 110. For example, as illustrated in FIG. 4, a contact 147 may extend from the expanded portion 145 to be in contact with the first sensing electrode 110.

In exemplary embodiments, at least one etched region 138 may be included in the connecting portion 120 connected to the second sensing electrodes 130. For example, the etched region 138 may have a hole shape formed in the connecting portion 137.

As illustrated in FIG. 4, the etched region 138 may be filled with the insulation layer 120. As illustrated in FIG. 3, the etched region 138 included in the connecting portion 137 may be covered by the extension portion 142 of the bridge electrode 140 in a planar view. In some embodiments, a plurality of the etched regions 138 may be arranged along the first direction below the extension portion 142.

According to exemplary embodiments as described above, the width of the extension portion 142 of the bridge electrode 140 may be reduced, and the width of the expanded portion 145 that may be directly connected to the first sensing electrode 110 may be increased. Thus, an area overlapping the connecting portion 137 may be reduced to suppress a parasitic capacitance.

As described above, the contact 147 may extend from the expanded portion 145, and, for example, may extend through the insulation layer 120 to be in contact with the first sensing electrode 110. In exemplary embodiments, the width of the extension portion 142 may be reduced while maintaining or increasing a width of the contact 147 so that a channel resistance increase via the first sensing electrodes 110 may be prevented. Accordingly, as illustrated in FIG. 3, an area of the expanded portion 145 including the contact 147 in a planar view may be increased. Thus, even though the width of the extension portion 142 is reduced, the channel resistance increase may be avoided by an increased area or volume of the contact 147 and the expanded portion 145.

Further, the etched region 138 may be formed at a portion of the connecting portion 137 overlapping the extension portion 142 of the bridge electrode 140 so that an area generating the parasitic capacitance may be further reduced. Areas of the bridge electrode 140 and the connecting portion 137 at an intersection area of the sensing electrodes 110 and 130 may be reduced so that visibility of the electrodes and color sense deviation due to a reflectivity difference at the intersection area may be prevented or alleviated.

The sensing electrodes 110 and 130, the connecting portion 137 and/or the bridge electrode 140 may include a transparent conductive oxide and/or a metal.

The transparent conductive oxide may include, e.g., indium tin oxide (ITO), indium zinc oxide (IZO), zinc oxide (ZnO), indium zinc tin oxide (IZTO), cadmium tin oxide (CTO), etc. These may be used alone or in a combination thereof.

Examples of the metal may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), or an alloy thereof (e.g., silver-palladium-copper (APC)). These may be used alone or in a combination thereof.

Preferably, the sensing electrodes 110 and 130, the connecting portion 137 and/or the bridge electrode 140 may include the transparent conductive oxide from an aspect of improving transmittance of the touch sensor.

The insulation layer 120 may include an inorganic insulation material such as silicon oxide, silicon nitride, etc., or an organic material such as an acryl-based resin, a siloxane-based resin.

Figure 7:
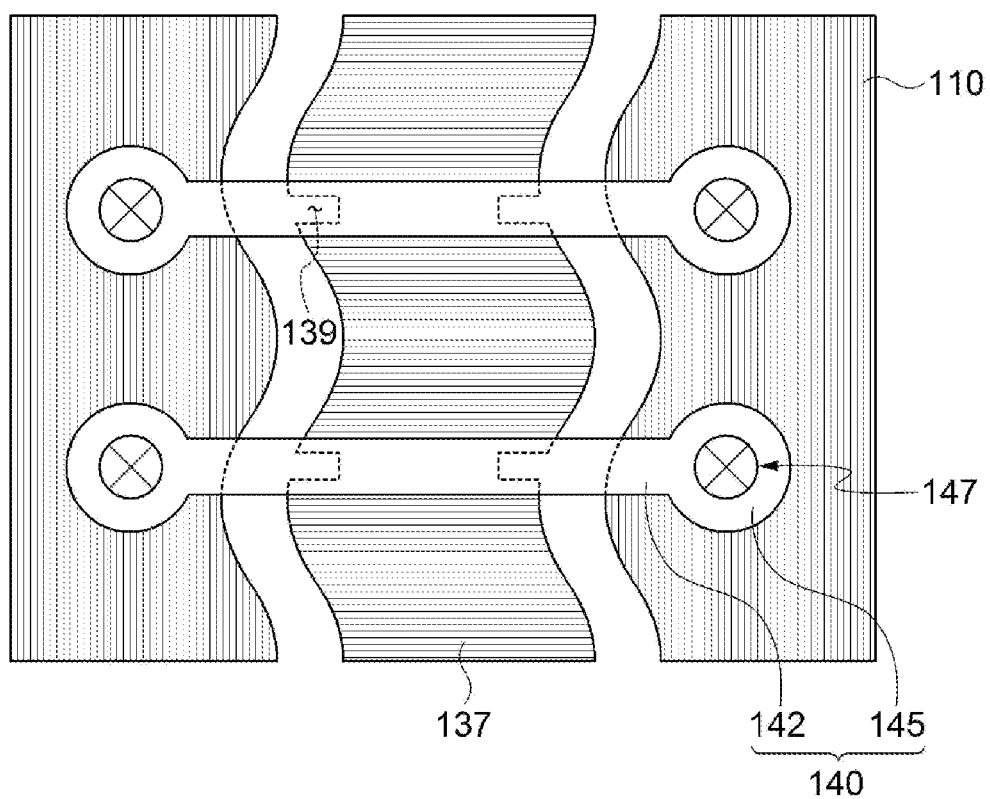
FIG. 7 is a partially enlarged top planar view illustrating schematic electrode arrangements of a touch sensor in accordance with some exemplary embodiments.

FIG. 3 illustrates the sensing electrodes 110 and 130 having a rhombus shape. However, the shape of the sensing electrodes 110 and 130 may be properly modified from an aspect of preventing the visibility of the electrodes, reducing the channel resistance, etc. For example, as illustrated in FIG. 7, boundaries of the sensing electrodes 110 and 130 may have a wavy shape.

Further, the sensing electrodes 110 and 130 may include line patterns therein which also have the wavy shape. Accordingly, pattern shapes of the sensing electrode 110 and 130 may be prevented from being viewed by a user, and moiré phenomenon caused by an overlap with structures of a display panel may be also prevented.

Figure 5A:
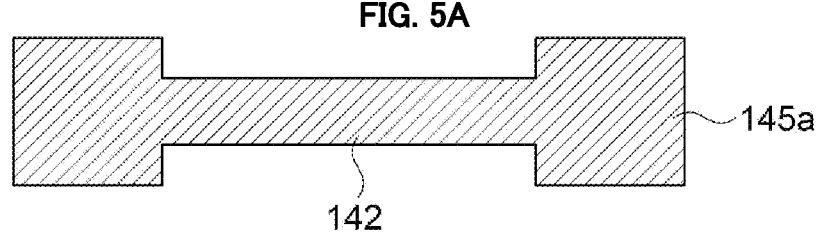
FIGS. 5A to 5C are top planar views illustrating shapes of a bridge electrode in accordance with some exemplary embodiments.
Figure 5B:
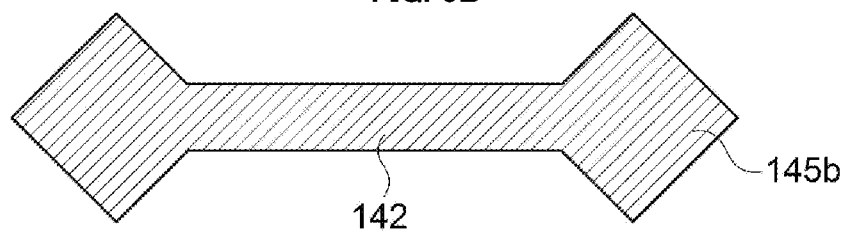
Figure 5C:
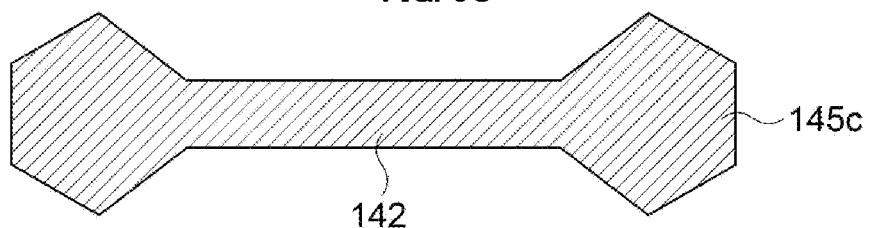

FIGS. 5A to 5C are top planar views illustrating shapes of a bridge electrode in accordance with some exemplary embodiments.

As described with reference to FIG. 3, the bridge electrode 140 may have the dumbbell shape including the expanded portion 145 that may have a relatively large width, and the shape of the expanded portion 145 may be modified in various forms. For example, as illustrate in FIG. 3, the expanded portion 145 may have substantially circular shape.

As illustrated in FIG. 5A, an expanded portion 145a may have a rectangular shape. As illustrated in FIG. 5B, an expanded portion 145*b* may have a rhombus shape. As illustrated in FIG. 5C, an expanded portion 145*c* may have a hexagonal shape.

Figure 6:
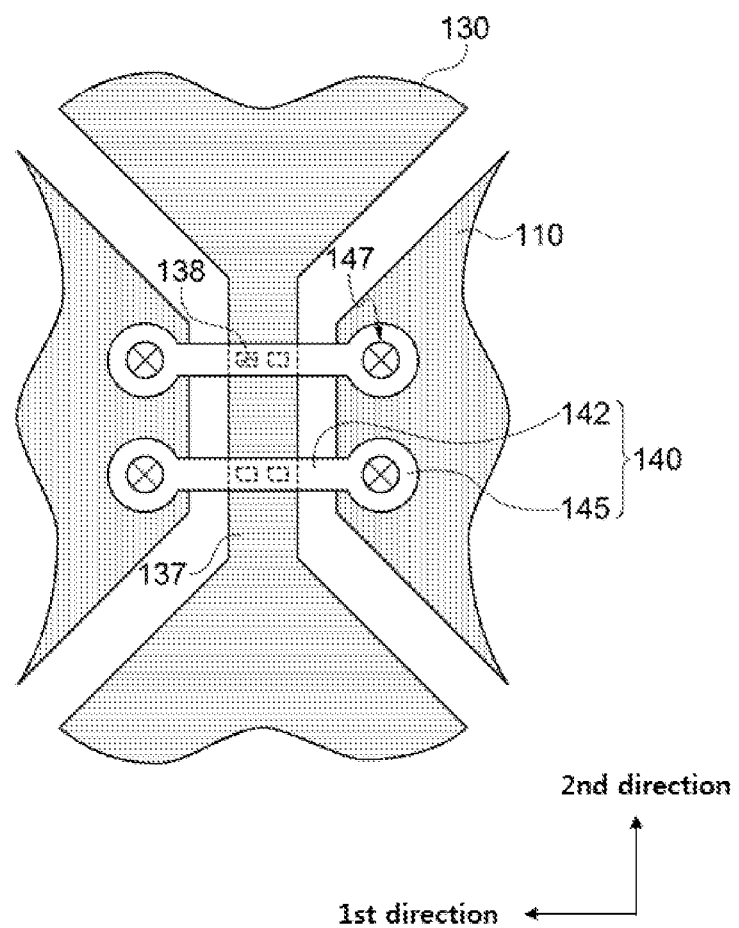
FIG. 6 is a partially enlarged top planar view illustrating schematic electrode arrangements of a touch sensor in accordance with some exemplary embodiments.

FIG. 6 is a partially enlarged top planar view illustrating schematic electrode arrangements of a touch sensor in accordance with some exemplary embodiments.

Referring to FIG. 6, a pair of the first sensing electrodes 110 neighboring each other may be electrically connected by a plurality of the bridge electrodes 140. For example, a plurality of the bridge electrodes 140 may be arranged along the second direction to electrically connect the pair of the first sensing electrodes 110 neighboring in the first direction to each other.

Etched regions 138 may be formed at portions of the connecting portion 137 overlapping the bridge electrodes 140. In some embodiments, a plurality of the etched regions 138 may be arranged along the first direction below the extension portion 142 of the bridge electrode 140 so that an etched region row may be defined. A plurality of the etched region rows may be formed along the second direction, and each etched region row may overlap the extension portion 142 of the bridge electrode 140.

As described above, a plurality of the bridge electrodes 140 may be formed so that generation of the parasitic capacitance and visibility of the electrodes due to the reflectivity difference may be more efficiently prevented.

FIG. 7 is a partially enlarged top planar view illustrating schematic electrode arrangements of a touch sensor in accordance with some exemplary embodiments.

Referring to FIG. 7, an etched region 139 included in the connecting portion 137 that may be connected to the second sensing electrode 130 may have a recess shape. For example, a pair of the etched regions 139 may be formed at both lateral portions of the connecting portion 137 to face each other.

The extension portion 142 of the bridge electrode 140 may be aligned over the connecting portion 137 to be superimposed over the etched regions 139. In some embodiments, a plurality of the bridge electrodes 140 may be arranged along the second direction, and the etched region 139 may be disposed under each extension portion 142 of the bridge electrode 140.

According to exemplary embodiments of the present invention, an image display device including the touch sensor or the touch screen panel as described above are provided.

Figure 8:
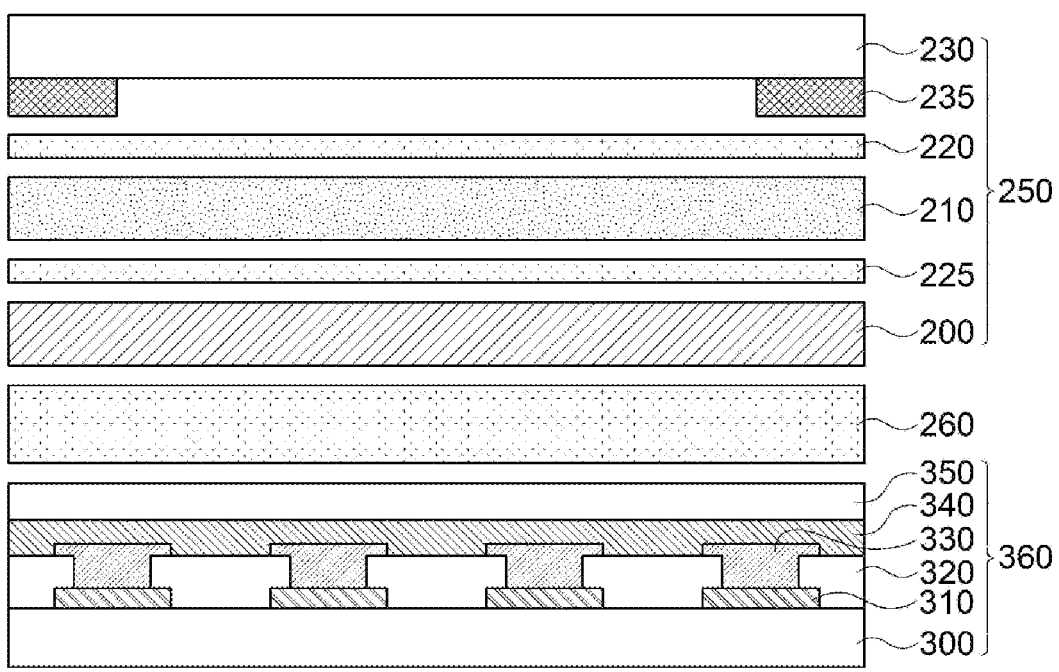
FIG. 8 is a schematic cross-sectional view illustrating a window stack structure and an image display device in accordance with exemplary embodiments.

FIG. 8 is a schematic cross-sectional view illustrating a window stack structure and an image display device in accordance with exemplary embodiments.

A window stack structure 250 may include a window substrate 230, a polarizing layer 210 and a touch sensor 200 according to exemplary embodiments as described above.

The window substrate 230 may include, e.g., a hard coating film. In an embodiment, a light-shielding pattern 235 may be formed on a peripheral portion of a surface of the window substrate 230. The light-shielding pattern 235 may include a color-printed pattern, and may have a single-layered or multi-layered structure. A bezel portion or a non-display region of the image display device may be defined by the light-shielding pattern 235.

The polarizing layer 210 may include a coating-type polarizer or a polarizing plate. The coating-type polarizer may include a liquid crystal coating layer that may include a cross-linkable liquid crystal compound and a dichroic dye. In this case, the polarizing layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 210 may be directly attached to the surface of the window substrate 230 or may be attached via a first adhesive layer 220.

The touch sensor 200 may be included in the window stack structure 250 as a film or a panel. In an embodiment, the touch sensor 200 may be combined with the polarizing layer 210 via a second adhesive layer 225.

As illustrated in FIG. 8, the window substrate 230, the polarizing layer 210 and the touch sensor 200 may be sequentially positioned from a viewer's side. In this case, sensing electrodes of the touch sensor 200 may be disposed under the polarizing layer 210 so that electrode patterns may be effectively prevented from being seen by the viewer.

If the touch sensor 200 includes a substrate, the substrate may include, e.g., triacetyl cellulose, cycloolefin, cycloolefin copolymer, polynorbornene copolymer, etc., and may have an in-plane retardation of ±2.5 nm or less.

In an embodiment, the touch sensor 200 may be directly transferred to the window substrate 230 or the polarizing layer 210. In an embodiment, the window substrate 230, the touch sensor 200 and the polarizing layer 210 may be sequentially positioned from the viewer's side.

The image display device may include a display panel 360 and the window stack structure 250 disposed on the display panel 360.

The display panel 360 may include a pixel electrode 310, a pixel defining layer 320, a display layer 330, an opposing electrode 340 and an encapsulation layer 350 disposed on a panel substrate 300.

A pixel circuit including a thin film transistor (TFT) may be formed on the panel substrate 300, and insulation layer covering the pixel circuit may be formed. The pixel electrode 310 may be electrically connected to, e.g., a drain electrode of the TFT on the insulation layer.

The pixel defining layer 320 may be formed on the insulation layer, and the pixel electrode 310 may be exposed through the pixel defining layer 320 such that a pixel region may be defined. The display layer 330 may be formed on the pixel electrode 310, and the display layer 330 may include, e.g., a liquid crystal layer or an organic light emitting layer.

The opposing electrode 340 may be disposed on the pixel defining layer 320 and the display layer 330. The opposing electrode 340 may serve as, e.g., a common electrode or a cathode of the image display device. The encapsulation layer 350 may be disposed on the opposing electrode 340 to protect the display panel 360.

In some embodiments, the display panel 360 and the window stack structure 250 may be combined with each other through an adhesive layer 260. For example, a thickness of the adhesive layer 260 may be greater than each thickness of the first adhesive layer 220 and the second adhesive layer 225. A viscoelasticity of the adhesive layer 260 may be about 0.2 MPa or less at a temperature ranging from −20° C. to 80° C. In this case, a noise from the display panel 360 may be blocked, and an interface stress while being bent may be alleviated so that damages of the window stack structure 250 may be avoided. In an embodiment, the viscoelasticity of the adhesive layer 260 may be in a range from about 0.01 MPa to about 0.15 MPa.

The touch sensor 200 may include the construction of the bridge electrode and the connecting portion according to exemplary embodiments as described above so that degradation of an image quality implemented from the display panel 360 may be prevented and improved touch sensitivity may be provided.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Experimental Example: Evaluation on Reflectivity and Chromaticity

Figure 9:
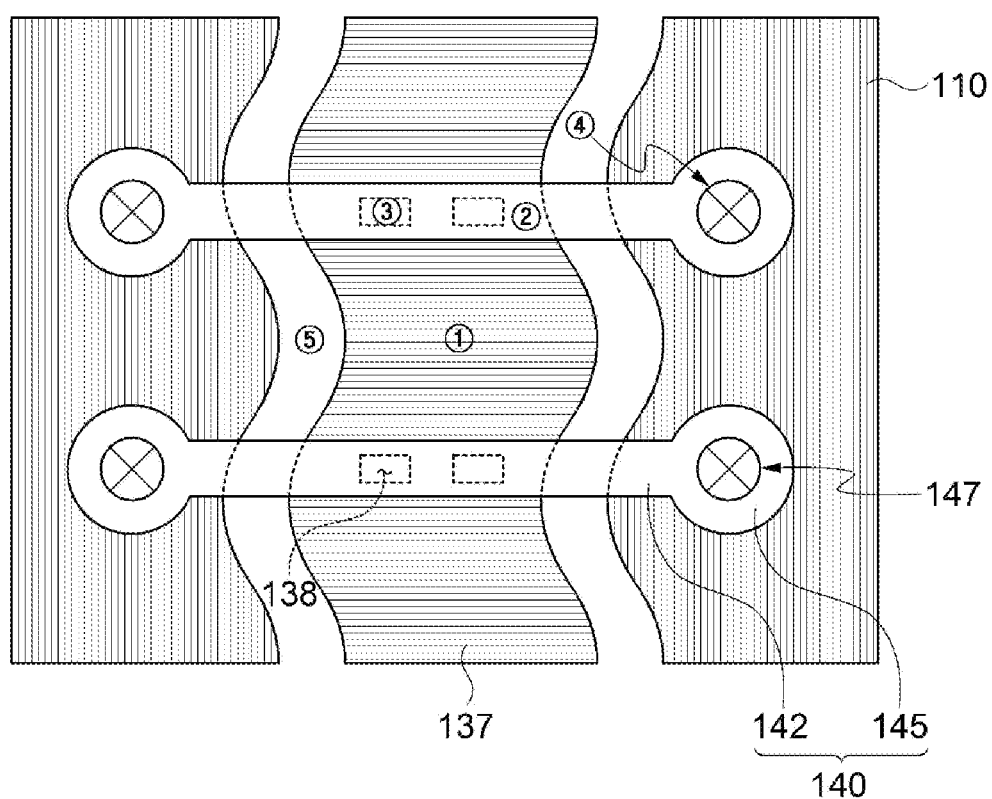
FIG. 9 is a top planar view illustrating positions for measuring reflectivity and chrominance in accordance with Experimental Example.

FIG. 9 is a top planar view illustrating positions for measuring reflectivity and chrominance in accordance with Experimental Example.

Specifically, ITO was deposited on a COP substrate, and then patterned to form the first sensing electrode 110, the second sensing electrode 130 and the connecting portion 137 (for convenience of explanation, an illustration of the second sensing electrode 130 is omitted in FIG. 9), each thickness of which was 450 Å. The etched regions 138 each having a hole shape with a dimension of 16 μm×80 μm were formed in the connecting portion 137.

An acryl-based resin was coated on the first sensing electrodes 110, the second sensing electrode 130 and the connecting portion 137 to form an insulation layer (not illustrated), and an ITO layer was deposited on the insulation layer and etched to form the bridge electrode 140 (thickness: 1250 Å) including the extension portion 142 and the expanded portion 145.

Specifically, a length of the extension portion 142 was 436 μm, a width of the extension portion was 34 μm, and a width (or a diameter) of the expanded portion 145 was 54 μm. The extension portion 142 was superimposed over the etched regions 138 of the connecting portion 137, and the expanded portion 145 was superimposed over the first sensing electrode 110 and was connected to the first sensing electrode 110 via the contact 147. A width (or a diameter) of the contact 147 that was formed to extend from the expanded portion 145 through the insulation layer to be in contact with the first sensing electrode 110 was 34 μm Reflectivity and chromaticity values at regions designated by numbers of FIG. 9 were measured using ST-4000DLX (KMAC). Specifically, an average reflectivity within a wavelength from 400 nm to 700 nm was measured.

The results are shown in Table 1 below.

TABLE 1

| Electrode layers construction | Reflectivity (%) | L* | a* | b* |
|---|---|---|---|---|
| ① Connecting portion ITO | 10.0 | 37.8 | −0.80 | −5.10 |
| ② Connecting portion ITO + Bridge electrode ITO | 10.5 | 38.7 | 3.20 | −14.70 |
| ③ Bridge electrode ITO | 8.9 | 35.8 | 4.71 | −12.94 |
| ④ Sensing electrode ITO + Bridge electrode ITO (expanded portion) | 10.5 | 38.7 | −5.55 | −4.60 |
| ⑤ No ITO | 8.3 | 34.6 | −0.33 | −0.82 |

Referring to Table 1, the reflectivity was remarkably reduced at an area (area designated as ③) including the etched region 138 in an overlapping area of the connecting portion 137 and the bridge electrode 140. Further, a chrominance between the areas of ① and ② was calculated as 10.4, and a chrominance between the areas of ① and ③ was calculated as 9.6.

The chrominance between two areas can be obtained by Equation below.

$$\Delta E(L^*, a^*, b^*) = \{(\Delta L^*)^2 + (\Delta a^*)^2 + (\Delta b^*)^2\}^{1/2}$$ [Equation]

Thus, as the width of the extension portion 142 in the bridge electrode 140 became reduced while forming the etched region 138 in the connecting portion 137, the reflectivity and chromaticity values were decreased to prevent the bridge electrode 140 from being viewed.

What is claimed is:

1. A touch sensor, comprising:
a base layer;
sensing electrodes arranged on the base layer, the sensing electrodes comprising:
first sensing electrodes arranged along a first direction parallel to a top surface of the base layer; and
second sensing electrodes arranged along a second direction parallel to the top surface of the base layer, the first direction and the second direction crossing each other;
a bridge electrode disposed on the sensing electrodes to electrically connect the first sensing electrodes neighboring in the first direction, the bridge electrode comprising an extension portion and expanded portions formed both ends of the extension portion, the expanded portions having a width in the second direction greater than that of the extension portion;
a connecting portion electrically connecting the second sensing electrodes neighboring in the second direction, the connecting portion including at least one etched region having a hole shape formed in the connecting portion or a recess shape formed at a lateral portion of the connecting portion; and
an insulation layer covering the connecting portion, wherein the bridge electrode is formed on the insulation layer to overlap the connecting portion.

2. The touch sensor according to claim 1, wherein the bridge electrode has a dumbbell shape.

3. The touch sensor according to claim 1, wherein the expanded portions are superimposed over the neighboring first sensing electrode, and at least a portion of the extension portions overlaps the at least one etched region of the connecting portion.

4. The touch sensor according to claim 3, wherein the at least one etched portion of the connecting portion includes a plurality of the etched regions formed along an extending direction of the extension portion.

5. The touch sensor according to claim 3, wherein a pair of the first sensing electrodes neighboring in the first direction are connected to each other by a plurality of the bridge electrodes.

6. The touch sensor according to claim 1, wherein the connecting portion is integrally connected to the second sensing electrodes neighboring each other.

7. The touch sensor according to claim 1, wherein the insulation layer fills the etched region formed in the connecting portion.

8. The touch sensor according to claim 1, wherein the bridge electrode includes a contact extending from the expanded portion to be in contact with the first sensing electrode, wherein the contact has a smaller width than that of the expanded portion.

9. The touch sensor according to claim 8, wherein the contact is formed through the insulation layer.

10. The touch sensor according to claim 1, wherein the etched region includes a pair of the recesses formed at both lateral portions of the connecting portion.

11. The touch sensor according to claim 1, wherein the sensing electrodes, the bridge electrode and the connecting portion include a transparent conductive oxide.

12. An image display device, comprising:
a display panel; and
the touch sensor of claim 1 on the display panel.

13. The image display device according to claim 12, further comprising an adhesive layer combining the display panel and the touch sensor with each other.

* * * * *